UNITED STATES PATENT OFFICE.

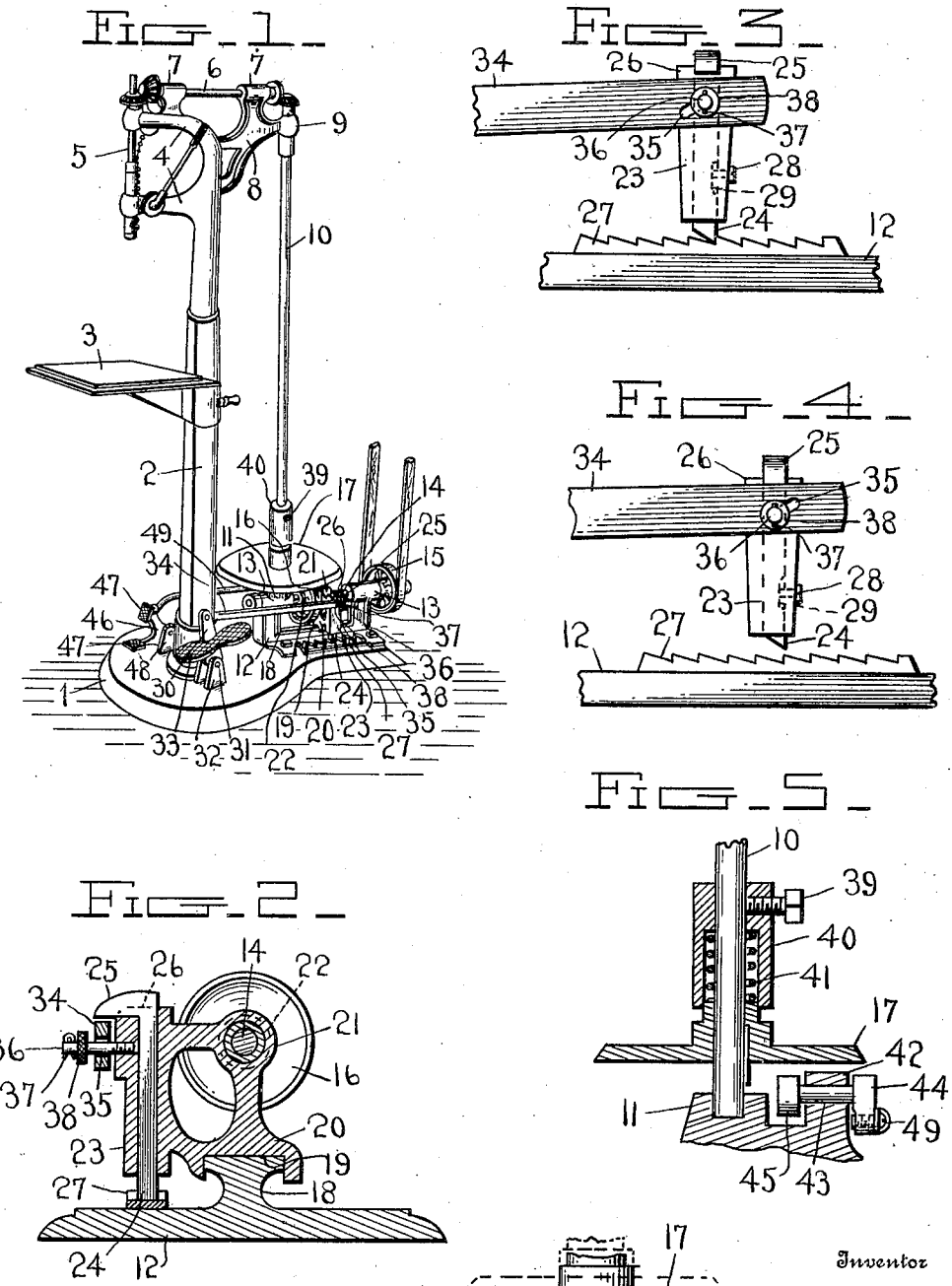

FRANK J. ZECHER, OF LANCASTER, PENNSYLVANIA, ASSIGNOR TO BARRY AND ZECHER CO., OF LANCASTER, PENNSYLVANIA.

GEARING.

No. 921,937.　　　　　Specification of Letters Patent.　　　　　Patented May 18, 1909.

Application filed September 19, 1907.　Serial No. 393,612.

*To all whom it may concern:*

Be it known that I, FRANK J. ZECHER, a citizen of the United States, residing at Lancaster, in the county of Lancaster and State of Pennsylvania, have invented certain new and useful Improvements in Gearing, of which the following is a specification.

This invention relates to new and useful improvements in gearing, and has more particular reference to a machine comprising in its general embodiment a drill - carrying shaft, a transmission shaft, a main driving shaft, and changeable speed gearing between the driving and transmission shafts.

The changeable speed gearing includes as an element a drive wheel mounted for sliding adjustment on the driving shaft, and it is a primary object of the invention to provide novel means for moving this driving wheel in either direction with relation to the transmission wheel, so as to correspondingly increase or decrease the speed of the machine.

As intimated, the driving wheel actuates a transmission wheel, mounted upon the transmission shaft and adapted for movement into and out of operative relation to the driving wheel, and the invention aims as a further object to provide novel means for effecting a movement of the transmission wheel in the above relations.

It is finally an object of the invention to provide a novel construction, combination, and arrangement of parts, the details of which will appear in the course of the following description, in which reference is had to the accompanying drawings forming a part of this specification, and in which is shown a merely preferred form of embodiment of the invention.

In the drawings: Figure 1 is a perspective view of a drilling machine constructed in accordance with the present invention; Fig. 2 is a cross section through the base of the machine, illustrative of the slidable bracket connected with the driving wheel; Fig. 3 is a fragmentary detail side elevation, illustrating a connection between an actuating arm and the bracket above referred to, the arm being shown in its lowered position with relation to said bracket; Fig. 4 is a similar view showing the arm in its raised position with relation to said bracket; Fig. 5 is a cross-sectional view illustrating the transmission wheel, its mounting, and the raising and lowering means therefor; and Fig. 6 is an elevation of the transmission wheel and its adjuncts.

The drilling machine is shown as comprising a base 1 and a standard 2, the latter supporting the adjustable shelf 3 and being provided above said shelf with projecting bearing arms 4 for the drill shaft 5. The latter is driven from a countershaft 6, journaled in bearings 7, one of which is cast with an arm 8 projecting from the standard 2. The arm 8 is likewise formed with a bearing 9 for a vertical transmission shaft 10, which drives the shaft 6, the shaft 10 having its lower end journaled in a boss 11 of the bracket 12.

Bracket 12 is secured to the base 1, and includes bearing sleeves 13 for a drive shaft 14, the latter being equipped with the belt wheel 15 and with a driving wheel 16 which is splined thereupon. The wheel 16 contacts with the under face of, and drives, a transmission wheel 17, which is splined upon the shaft 10.

The bracket 12 is provided rearwardly of the boss 11 with a raised track portion 18, which fits as a guide in a channel 19 in the under face of a sliding bracket 20. The latter is formed with an annulus 21, constructed to loosely surround and fit into a groove in the hub 22 of the wheel 16. The bracket 20 is formed at one side thereof with a vertical sleeve 23, in which is mounted a sliding gravity pawl 24, having its extended upper end formed with an outwardly projecting head 25, disposed between guide lugs 26 provided at the upper end of the sleeve 23. The pawl 24 has its lower end formed for engagement with a series of rack teeth 27 provided upon the base flange of the bracket 12. Vertical movement of the pawl 24 in either direction is restricted by a stop screw 28, threaded through the sleeve 23 and having its end projecting into a groove or depression 29 in the surface of said pawl.

For the purpose of effecting a movement of the bracket 20 in either direction, and consequently of the wheel 16, a foot lever 30 is mounted by means of trunnions 31 between brackets 32 provided upon the base 1, the lever 30 having at one side thereof a treadle 33. Pivoted to the upper end of the lever 30 is an arm 34, which at its rear end has an inclined slot 35. The sleeve 23 has threaded thereinto a pin 36 which projects through the slot 35 and which carries on its end a cotter pin 37 and a washer 38. The arm 34 is supported at its rear end by the pin 36, and the head 25 of the pawl 24 rests upon said arm. It will be apparent that when the arm 34 is drawn forwardly the bracket 20 will move therewith, the pin 36 impinging the rear end of the slot 35 and the pawl 24 riding over the teeth 27. When the arm 34 is pushed rearwardly, the pin 36 will act on the cam slot 35 to raise said arm as shown in Fig. 4, and consequently to raise the pawl 24 from engagement with the teeth 27, whereby the bracket 20 moves rearwardly in the continued movement of said arm, the pin 36 impinging the forward end of the slot 35. In the movement of the bracket 20 in either direction, the wheel 16 is correspondingly moved toward or away from the center of the wheel 17, so that the speed of the machine is increased or decreased. The pawl 24 is automatic in its operation, and affords a means for holding the bracket 20 against working rearwardly from any selected position to which it may be set.

Mounted upon the shaft 10 by means of a set screw 39 is a socket 40, in which is disposed an expansive coil spring 41 surrounding said shaft and bearing against the hub of the wheel 17, the function of the spring 41 being to hold the wheel 17 in strong frictional contact with the wheel 16. Adjacent the wheel 17, the base 1 is provided with a bracket bearing 42, in which is journaled a rock shaft 43 carrying at its outer end a crank arm 44 and at its inner end a cam 45 for engagement with the under face of the wheel 17 to raise the same against the tension of the spring 41. In order to rotate the shaft 43, a bell crank lever 46 having foot pieces 47 is provided, the lever 46 being pivoted between brackets 48 and being connected by means of a link 49 with the crank arm 44. The manner of raising the wheel 17 by the cam 45 is shown in Fig. 6 by dotted lines, and it will be apparent that when the wheel 17 is raised out of contact with the wheel 16 the operation of the machine will be stopped.

What I claim is:

1. In a machine of the type set forth, a transmission shaft, a transmission wheel mounted thereon, a drive shaft, a drive wheel mounted thereon and contacting with said transmission wheel, said drive wheel being adjustable toward and away from the center of said transmission wheel, a sliding element connected with said drive wheel to move the same axially of its shaft, a rack, a pawl carried by said sliding element for engagement with said rack, and means for moving said element in either direction, including means for automatically disengaging said pawl from said rack in the movement of said element in one direction, and permitting said pawl to ride over said rack in the movement of said element in the other direction.

2. In a machine of the type set forth, a transmission shaft, a transmission wheel mounted thereon, a drive shaft, a drive wheel mounted thereon and contacting with said transmission wheel, said drive wheel being adjustable toward and away from the center of said transmission wheel, a sliding element connected with said drive wheel to move the same axially of its shaft, a rack, a pawl carried by said element and having a projecting head, a movable arm positioned to engage said head and having an inclined slot, a pin carried by said element and projecting through said slot, and means for moving said arm in either direction.

In testimony whereof I affix my signature in presence of two witnesses.

FRANK J. ZECHER.

Witnesses:
S. Z. MOORE,
RICHARD M. REILLY.